Nov. 29, 1960     K. R. LUNG     2,962,612
SUBMERSIBLE MOTOR CONSTRUCTION
Filed March 18, 1957
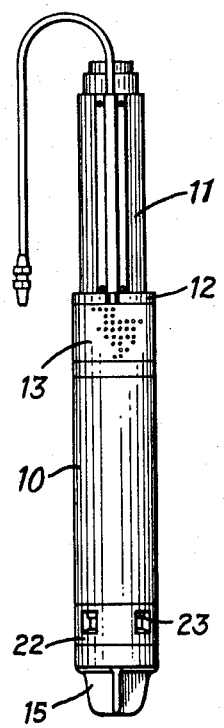
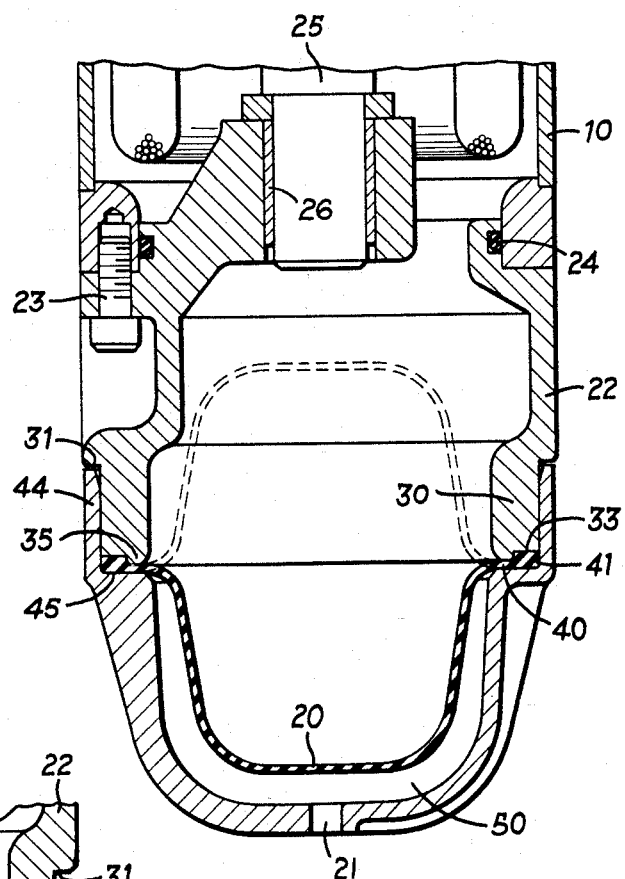
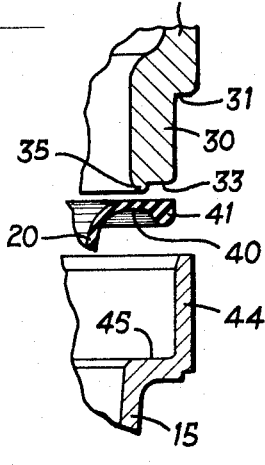
*INVENTOR.*
KENNETH R. LUNG
BY
Marechal, Biebel, French & Bugg
ATTORNEYS

United States Patent Office 2,962,612
Patented Nov. 29, 1960

2,962,612

SUBMERSIBLE MOTOR CONSTRUCTION

Kenneth R. Lung, Dayton, Ohio, assignor to The Tait Manufacturing Company, Dayton, Ohio, a corporation of Ohio Filed Mar. 18, 1957, Ser. No. 646,667

1 Claim. (Cl. 310—87)

This invention relates to submersible pumps.

The invention has particular relation to submersible pumps of the type including a motor as a part of the entire assembly which is submerged in a well, and with the motor depending below the pump. If such motor is of the oil-filled type, it is necessary to provide for equalization of pressure between the interior of the motor casing and the outside liquid under the changing conditions of temperature within the casing incident to use, and this may be accomplished by the provision of a flexible diaphragm mounted with its opposite sides exposed respectively to the liquid inside and outside the casing. For example, a cup-shaped diaphragm may be mounted within the lower end of the casing with its convex side normally facing the interior of the casing so that it may be turned inside-out as the oil within the casing is heated by the operation of the motor. However, the restrictions on the dimensions of the motor casing for a submersible pump are relatively severe, commonly involving an overall diameter of less than 4 inches. Since the dimensions of the diaphragm are correspondingly limited, and since also the rim of the diaphragm must be suitably secured withing the casing, the portion thereof subjected to such repeated flexing is relatively small and tends to wear out in a comparatively short time.

It is a primary object of the present invention to provide an end construction for a submersible motor of the liquid-filled type which includes a cup shaped diaphragm of the maximum dimensions for the overall diameter of the motor casing, and in which also this diaphragm is not subjected to turning inside-out under normal operating conditions and is therefore offered maximum protection against premature failure.

An additional object of the invention is to provide such an end construction for a submersible motor in which the outer diameter of the diaphragm is at substantially the maximum for the overall diameter of the motor casing, and in which also the minimum proportion of the diaphragm is required for mounting purposes so that the maximum area thereof is available for movement in response to changes in the relative pressures inside and outside the motor casing.

It is also an object of the invention to provide an end construction for a submersible motor which offers the features and advantages noted above and which in addition comprises the minimum number of component parts for economical fabrication as well as assembly and maintenance.

Further objects and advantages of the invention will be apparent from the following description, the accompanying drawing and the appended claims:

In the drawing—

Fig. 1 is a perspective view illustrating a submersible pump assembly of the type to which the presnt invention relates;

Fig. 2 is an enlarged fragmentary view in axial section through the lower end of the motor portion of the assembly of Fig. 1; and Fig. 3 is a fragmentary exploded view in section of the parts shown in Fig. 2.

Referring to the drawing, which illustrates a preferred embodiment of the invention, the submersible pump assembly shown in Fig. 1 includes a motor casing 10 and a pump shell 11 connected by an intake cap 12 covered by a screen 13, and details of the construction of these parts of the assembly are disclosed in my copending application Serial No. 633,412, filed January 10, 1957 and Serial No. 646,693, filed of even date herewith, both of which are assigned to the same assignee as this application. The present invention is concerned particularly with the construction at the lower end of the motor casing 10 and its cooperating cup-shaped end cap 15 for housing the diaphragm 20 of rubber material which provides a flexible seal between the interior of casing 10 and the external pressure entering cap 15 through the opening 21 in its lower end.

A bracket 22 is secured in sealed relation with the lower end of the motor casing as by means of screws 23 and an O-ring 24, and the inner end portion of this bracket is shown as forming a support for the lower end of the motor shaft 25 in a bushing 26. At its lower or outer end, the bracket 22 is formed with a cylindrical flange 30 which is of reduced diameter with respect to the major portion of the length of the bracket to leave an annular shoulder 31 at the base of this flange. The annular end face 33 of flange 30 is flat over the major portion of its radially outer surface, but an annular rib 35 projects therebeyond along the inner periphery of face 33.

The diaphragm 20 is of generally cup-shape similar in outline to the interior of cap 15 but of somewhat smaller dimensions to leave a clearance space therebetween in the assembled position shown in Fig. 2. The diaphragm 20 is formed with a peripheral rim 40 which extends generally radially outwardly to a diameter approaching or slightly less than the outer diameter of the end face 33. In addition, the rim 40 includes a circumferential bead 41 of substantially greater thickness than the remainder of the diaphragm and of an inner diameter sufficiently greater than the outer diameter of rib 35 to lie therebeyond when the parts are assembled.

The cap 15 is formed with a cylindrical flange 44 at its open end which is proportioned for press fitted telescoping engagement over the flange 30, satisfactory results for this purpose having been obtained with the inner diameter of flange 44 about .006 inch less than the outer diameter of flange 30. At the base of flange 44 is an internal annular seat 45 which is therefore in line with the opposing end face 33 on flange 30, and which is of slightly greater inner diameter than the flange 30 and rib 35. The axial length of flange 44 is also accurately correlated with the corresponding dimension of flange 30 to cause the end of flange 44 to engage shoulder 31 before the rib 35 reaches seat 45, and thereby to leave a predetermined clearance between seat 45 and both face 33 and rib 35.

When these parts are assembled as shown in Fig. 2, the bead 41 on rim 40 of diaphragm 20 lies outside rib 35, and then as cap 15 is forced to its inner limit position established by shoulder 31, the bead 41 is clamped and deformed between face 33 and seat 45. At the same time, rim 40 is clamped between rib 35 and seat 45 to prevent any possible inward withdrawal of bead 41, but the parts are proportioned as described to prevent undue pinching or squeezing of any portion of the diaphragm which might cut or otherwise weaken the rubber material. By way of illustration, satisfactory results have been obtained with the diaphragm of an overall thickness of .063 inch, the bead 41 having a diameter of .156 inch, and with the relative dimensions of the flanges 30 and 44 such that the minimum spacing from seat 45 to rib 35 and face 33 is respectively .044 and .084 inch.

In the operation of the motor with these parts assembled as described, when the motor is at rest, the diaphragm 20 will assume approximately the position shown in Fig. 2, and there will be a clearance of substantial volume between the adjacent walls of the diaphragm and the cap 15, which is indicated at 50 in Fig. 2. This clearance with the parts proportioned as shown has been found entirely adequate for normal expansion of the oil within the motor casing as the motor heats up in operation, and the movements of the diaphragm under conditions of changing temperature and pressure take the form of relatively evenly distributed stretching supported over the entire clamped portion of the rim 40. Under normal conditions, the diaphragm will therefore retain approximately the form shown in Fig. 2, but if oil should leak from the interior of the casing, the diaphragm will be able to shift from its normal position to correct therefor, as indicated in dotted lines in Fig. 2.

The construction of the invention thus provides the maximum practical dimensions for the diaphragm 20, and particularly for that portion of the diaphragm which supports both its expansion under pressure increases and also whatever reversal of its shape may take place. This contrasts particularly with the conditions which would exist if the cap 15 and bracket 22 were secured together by screws, since a much larger portion of the diaphragm rim would then be clamped or else its original outer diameter would be substantially less, either of which conditions would correspondingly reduce the effective diaphragm area. Furthermore, in such other cases, the life expectancy of the diaphragm would be materially less then with the construction of the invention, and this advantage is in addition to the simplicity and economy of fabrication and assembly of the component parts of the present end construction, which all thus contribute to the practical value of the invention.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A bottom end construction for the casing of a submersible motor of the liquid-filled type, comprising a flange of cylindrical section on the end of said casing, a hollow cap of generally cup shape including a flange of cylindrical section proportioned for press fitted telescoping engagement over said casing flange, said cap flange having an internal annular seat at the inner end thereof aligned with said casing flange, said casing flange having an annular end face opposing said seat and including an annular rib projecting axially from the inner portion thereof, a cup shaped diaphragm of flexible material proportioned for reception within said cap and having a peripheral rim of substantially the same diameter as the outer diameter of said seat, said diaphragm including a circumferential bead extending around said rim and of greater inner diameter than the outer diameter of said rib, means on said casing forming an external annular shoulder of substantially the same radial dimensions as said cap flange, said cap flange being proportioned for engagement with said shoulder limiting the telescoping engagement of said flanges to a predetermined extent less than the axial length of said cap flange to establish controlled clamping of said diaphragm bead between said end face and said seat, and said flanges being of substantial length axially of said casing and constituting the only securing means between said cap and said casing while providing for separation thereof upon the development of a greater pressure within said casing than the pressure surrounding the outside pressure.

References Cited in the file of this patent
UNITED STATES PATENTS

| | | |
|---|---|---|
| 1,141,515 | Alvey | June 1, 1915 |
| 1,545,353 | Rosell et al. | July 7, 1925 |
| 1,810,091 | Siegle | June 16, 1931 |
| 1,974,323 | Allen | Sept. 18, 1934 |
| 2,489,491 | Johnson | Nov. 29, 1949 |
| 2,674,702 | Arutunoff | Apr. 6, 1954 |

UNITED STATES PATENT OFFICE
CERTIFICATION OF CORRECTION

Patent No. 2,962,612 November 29, 1960

Kenneth R. Lung

It is hereby certified that error appears in the above numbered patent requiring correction and that the said Letters Patent should read as corrected below.

Column 4, list of references cited, after line 43, add the following:

2,739,252 Patterson et al.----- Mar. 20, 1956

Signed and sealed this 2nd day of May 1961.

(SEAL)
Attest:

ERNEST W. SWIDER
Attesting Officer

DAVID L. LADD
Commissioner of Patents